United States Patent [19]

MacAulay et al.

[11] Patent Number: 5,758,127
[45] Date of Patent: May 26, 1998

[54] METHOD AND APPARATUS FOR PROVIDING A PLURALITY OF PROTOCOL SERIAL COMMUNICATIONS

[75] Inventors: Ian MacAulay, Milton Keynes; Norman Hopkins, Ascot, both of United Kingdom; Brian C. Daellenbach, Santa Clara, Calif.; Paul Denman, Bedfont; Jamie Osbourne, Lower Earley, both of United Kingdom

[73] Assignee: VLSI Technology, Inc., San Jose, Calif.

[21] Appl. No.: 742,411

[22] Filed: Nov. 4, 1996

Related U.S. Application Data

[63] Continuation of Ser. No. 278,309, Jul. 21, 1994, abandoned.
[51] Int. Cl.$^6$ ................................................. H04L 15/02
[52] U.S. Cl. ................................................. 395/500; 395/891
[58] Field of Search ................................. 395/500, 800, 395/846, 481, 775, 831, 442; 364/187, 240.5; 358/426, 433

[56] References Cited

U.S. PATENT DOCUMENTS

| | | | |
|---|---|---|---|
| 4,748,511 | 5/1988 | Nichols et al. | 358/433 |
| 4,761,735 | 8/1988 | Amy | 395/846 |
| 4,975,828 | 12/1990 | Wishneusky et al. | 395/831 |
| 5,142,528 | 8/1992 | Kobayashi et al. | 370/79 |
| 5,313,386 | 5/1994 | Cook et al. | 364/187 |
| 5,349,685 | 9/1994 | Houlberg | 395/800 |
| 5,455,923 | 10/1995 | Kaplinsky | 395/481 |
| 5,485,590 | 1/1996 | Hyatt et al. | 395/442 |

FOREIGN PATENT DOCUMENTS

| | | | |
|---|---|---|---|
| 0133117A2 | 2/1985 | European Pat. Off. | 13/12 |
| 0639916A2 | 2/1995 | European Pat. Off. | 29/6 |
| 2224621 | 5/1990 | United Kingdom . | |
| 2241854 | 9/1991 | United Kingdom | 12/28 |
| WO8701484 | 3/1987 | WIPO | 13/42 |

OTHER PUBLICATIONS

IEEE Standard Microcontroller System Serial Control Bus, 1990.
"Using the Serial Peripheral Interface to Communicate Between Multiple Microcomputers," AN–991, pp. 365–371.
"HPC Microwire/Plus™ Master–Slave Handshaking Protocol," AN–474, pp. 5.2–5.10.
"Microwire™ Serial Interface", AN–452, pp. 3.131–3.141.
"The I$^2$C–Bus Specification," Philips Components, pp. 1–27.

Primary Examiner—Kevin J. Teska
Assistant Examiner—Dan Fiul
Attorney, Agent, or Firm—Hickman Beyer & Weaver

[57] ABSTRACT

A digital communication system including a digital controller (11), a master circuit (14) capable of communicating in a variety of serial protocols, and at least one slave circuit (16). The digital controller is preferably a microprocessor. The master circuit is configured in a selected serial protocol by the digital controller in response to data words provided by the digital controller. The slave circuit is connected to the master circuit and communicates in the master circuit's selected serial protocol under the control of data words sent from the digital controller to the master circuit. The master circuit is a bi-directional, parallel-to-serial and serial-to-parallel interface circuit having three programmable channels (CHANNEL 0, 1, 2). A method for serial communications includes coupling a master circuit (14) to a digital controller (11), coupling the master circuit to at least one slave circuit (16), and configuring the master circuit in a selected serial protocol by using a process implemented by the digital controller. The digital controller and the master circuit communicate, in parallel, by data words.

40 Claims, 14 Drawing Sheets

| d7 | d6 | d5 | d4 | d3 | d2 | d1 | d0 |
|---|---|---|---|---|---|---|---|
| TYPE 1 | TYPE 0 | INVERT OUTPUT | 1/4 CYCLE | SR END | OPEN DRAIN | DIR | SR CLOCK |

| | | |
|---|---|---|
| d7 | TYPE 1 | TYPE 1  TYPE 0<br>0  0  REFERENCE CLOCK USED TO CLOCK OUT DATA FROM SHIFT REGISTER - DATA CHANNEL<br>0  1  FREE RUNNING CLOCK - REFERENCE CLOCK OUT DIRECTLY TO PIN } CLOCK CHANNELS<br>1  0  WINDOWED CLOCK - GATED BY SHIFT REGISTER, OFF LOW<br>1  1  WINDOWED CLOCK - GATED BY SHIFT REGISTER, OFF HIGH |
| d6 | TYPE 0 | |
| d5 | INVERT OUTPUT | 0: DATA OUTPUT TO PIN IS NOT INVERTED<br>1: DATA OUTPUT TO PIN IS INVERTED |
| d4 | 1/4 CYCLE | 0: NO DELAY ON DATA OUTPUT<br>1: A 1/4 CYCLE DELAY IS ADDED TO THE OUTPUT DATA |
| d3 | SHIFT REGISTER END | SETS THE LOGIC VALUE WHICH WILL BE CLOCKED INTO THE SHIFT REGISTERS LSB DURING OPERATION. |
| d2 | OPEN DRAIN | 0: PUSH-PULL IF CHANNEL IS OUTPUT<br>1: OPEN-DRAIN IF CHANNEL IS OUTPUT |
| d1 | DIR | 0: CHANNEL IS INPUT<br>1: CHANNEL IS OUTPUT |
| d0 | SHIFT REGISTER CLOCK | 0: RISING EDGE OF REFERENCE CLOCK USED TO CLOCK SHIFT REGISTER<br>1: FALLING EDGE OF REFERENCE CLOCK USED TO CLOCK SHIFT REGISTER |

FIG. 3

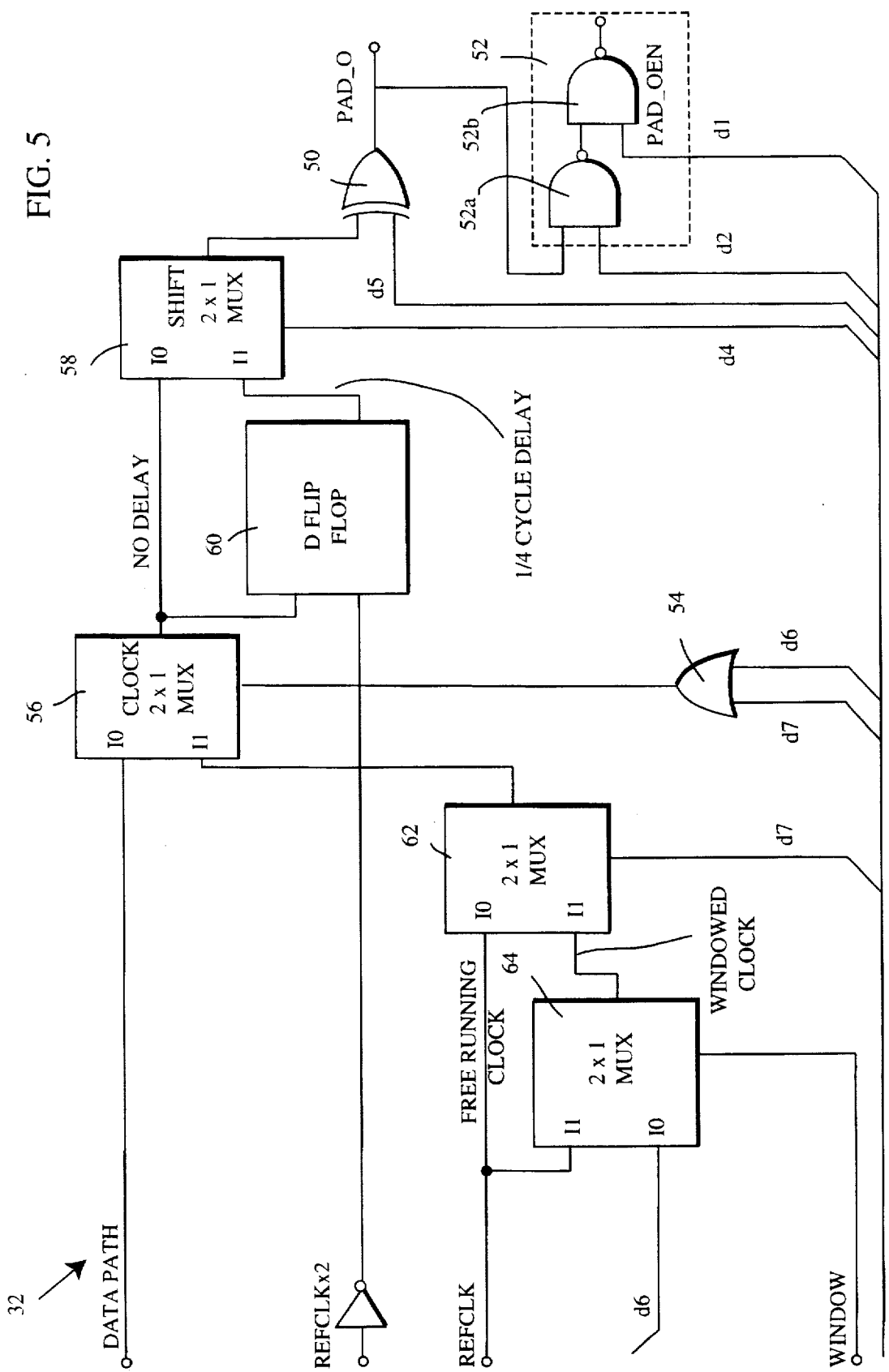

FIG. 6a

| d7 | d6 | d5 | d4 | d3 | d2 | d1 | d0 |
|---|---|---|---|---|---|---|---|
| NOT USED | NOT USED | NOT USED | NOT USED | COUNT 3 | COUNT 2 | COUNT 1 | COUNT 0 |

STARTING VALUE OF WINDOW COUNTER

| COUNT 3 | COUNT 2 | COUNT 1 | COUNT 0 |
|---|---|---|---|

| d7 | d6 | d5 | d4 | d3 | d2 | d1 | d0 |
|---|---|---|---|---|---|---|---|
| NOT USED | NOT USED | SRC 1 | SRC 0 | B3 | B2 | B1 | B0 |

| | |
|---|---|
| SRC 1 | TYPE 1 TYPE 0  REFERENCE CLOCK SOURCE |
| SRC 0 | 0 0  INTERNAL RATE SELECTED ACCORDING TO B3, B2, B1, AND B0<br>0 1  daa_0 INPUT PIN<br>1 0  daa_1 INPUT PIN<br>1 1  daa_2 INPUT PIN |
| B3 | |
| B2 | THESE BITS SELECT A BIT RATE ACCORDING TO THE FREE RUNNING TIMER. |
| B1 | THE ACTUAL RATE DEPENDS UPON THE CLOCK APPLIED TO THE SYSTEM. |
| B0 | |

FIG. 6b

METHOD AND APPARATUS FOR PROVIDING A PLURALITY OF PROTOCOL SERIAL COMMUNICATIONS

This is a continuation of application Ser. No. 08/278,309 filed Jul. 21, 1994, now abandoned.

TECHNICAL FIELD

This invention relates generally to electronic circuitry and more particularly to digital communication systems including data transfer protocols.

BACKGROUND ART

Digital communication systems can be used to transfer data between digital devices. For a particular digital communication system, a "digital protocol" embodies the communications requirements and formats for data transfer. For example, a digital protocol can specify a method of "handshake" verification of a successful communications link between system elements. A data protocol can also detail the method for determining the direction of data flow during a data transfer and the types of data being transmitted. Circuits within a communications system must use the same digital protocol to prevent data loss or blockage.

Serial digital protocols are popular because they allow digital connections over a small number of wires. Several common serial digital protocols use either two or three wires. These protocols are therefore referred to as "two-wire protocols" and "three-wire protocols".

The current state of the art for transferring data in formatted character streams between a microprocessor and a "slave" circuit (i.e. a digital device controlled by the microprocessor) uses a hardwired serial interface circuit. Examples of communications systems using digital serial protocols are automotive braking systems which must communicate road information from each wheel to a master circuit and sensors at the joints of robot arms which must relay information to a processor to affect motion of the entire arm.

A widely used serial protocol is the National Semiconductor Microwire™ serial protocol. This three-wire protocol is typically built into hardware and cannot be changed or reconfigured after manufacture. Data is shifted in and out on a rising edge of a clock, and only master and slave circuits having digital controllers hard-wired with the same handshake protocol can be connected to each other.

Another widely-used serial protocol is the Phillips I²C™ serial protocol. This two-wire protocol is also typically implemented in hardware and thus cannot be changed or reconfigured after manufacture. It uses a master clock produced by a master circuit to synchronize data transfers. These circuits are limited to communicating with other circuits utilizing the Phillips I²C™ serial protocol.

A problem with digital communications systems of the prior art is that they lack flexibility. In the past, a digital protocol was typically chosen by a system designer and was implemented in hardware. Therefore, for example, an end user would be unable to specify an I²C protocol if the system was hardwired with a Microwire protocol. Hardwired interfaces also prevent end users from creating their own, customized protocols.

It should be noted that a microprocessor coupled to, for example, a parallel port can be programmed to emulate in software a number of serial protocols. Such a solution would provide flexibility to the end-user, but is very wasteful of processing power. As a result, the use of a microprocessor to emulate in software a variety of serial protocols is not a practical solution to the aforementioned problem.

DISCLOSURE OF THE INVENTION

The present invention solves these problems with a method and an apparatus which provides a digital communication system including a digital controller (typically a microprocessor), a master circuit capable of communicating in a variety of serial protocols, and at least one-slave circuit. The master circuit is configured to a selected serial protocol by the digital controller, and serves as a parallel-to-serial interface circuit between the digital controller and the slave circuit. The slave circuit is coupled to the master circuit and is responsive to communications in the master circuit's selected serial protocol.

In a preferred embodiment, the digital controller can configure various channels of the master circuit to provide two-wire or three-wire serial protocols. The digital controller communicates with the master circuit with multi-bit words. The master circuit preferably includes a control register permitting the various channels of the master circuit to operate as either a data channel or a clock channel. If the channel is a clock channel, it can be either free-running or windowed. If the channel is a data channel, the control register can select data inversion, delay, direction, and the triggering edge of an input clock.

The apparatus therefore preferably provides a serial interface circuit having several programmable channels responsive to a common address/data/control bus. Each channel has a dedicated input/output (I/O) port. Collectively, these I/O ports can support a selected serial protocol based upon a programming of the channels. The digital controller communicates with the master circuit with multi-bit words, thereby relieving the digital controller of direct bit-by-bit control of communications protocol. This greatly reduces the processing load on the digital controller.

A method of serial communication in accordance with the present invention is obtained by coupling a master circuit to a digital controller, coupling the master circuit to at least one slave circuit, and configuring the master circuit in a selected serial protocol. The master circuit communicates with the digital controller in multi-bit words and implements the selected serial protocol for the digital controller.

The present invention having a parallel-to-serial interface master circuit configurable in a wide variety of two-wire and three-wire protocols is a major advance over the previously described prior art. This flexibility frees circuit designers from the need to adhere to arbitrary proprietary standards and allows them to create communications systems particularly tailored to specific applications. Designers no longer need to be concerned with the compatibility of various components during design because the configurable, flexible, interface automatically solves these problems. Indeed, the interface can communicate in one protocol to communicate with a select group of components and can then be reconfigured in another protocol to communicate with other components.

Previously, this flexibility could be implemented in software by the digital controller (i.e. the microprocessor) itself but only at a great processing burden to the digital controller. However, ability of the digital controller to communicate, in parallel, with the master circuit in full words rather than in a bit stream greatly reduces the communications burden on the digital controller.

Because of the extremely wide range of uses for computers, microprocessors, and computer networks, the flexible serial interface of the invention can be used in a multitude of devices. These and other advantages of the present invention will become apparent upon reading the following detailed descriptions and studying the various Figs. of the drawings.

BRIEF DESCRIPTION OF THE DRAWINGS

FIG. 3 is table showing the contents of a control register of FIG. 2.

FIG. 5 is a schematic diagram of a multiplexer/delay/inverter circuit of FIG. 2.

FIG. 6a illustrates the contents of a counter control register.

FIG. 6b illustrates the contents of a clock control register.

BEST MODE FOR CARRYING OUT THE INVENTION

Figure 1:
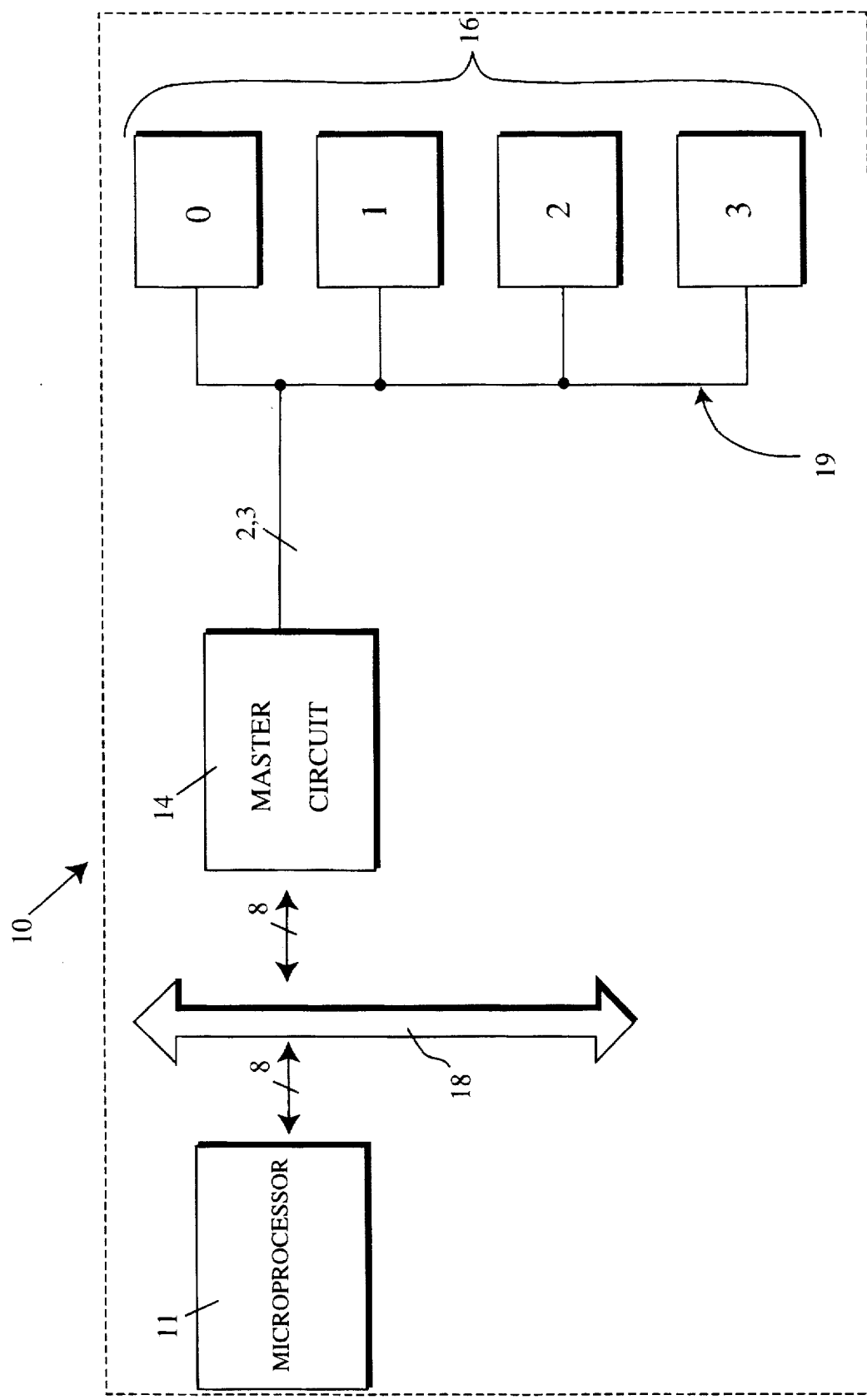
FIG. 1 is a block diagram of a digital communication system in accordance with the present invention.

In FIG. 1, a preferred embodiment of a digital communication system 10 in accordance with the present invention includes a digital controller 11, master circuit 14, and one or mores slave circuits 16. The digital controller 11, the master circuit 14, and the slave circuits 16 are all digital devices operating with digital logic states. These logic states will be referred to herein as variously 0, low, and LO for the logic state "0", and 1, high, and HI for the logic state "1." By convention, a LO logic state is often at about 0 volts d.c., and a HI logic state is often at about 5 volts d.c. Another convention uses 0 volts d.c. and 3 volts d.c. as representing LO and HI logic states. Still other conventions can be chosen.

The digital controller 11 is typically a microprocessor, such as an ARM microprocessor made by VLSI Technology, Inc. and Sharp, Inc., and others. Alternatively, the microprocessor could be an Intel x86 compatible microprocessor or a Motorola 680X0 compatible microprocessor, for example. The digital controller 11 can also be implemented as microcontroller or a state machine, for example. Preferably, however, the digital controller 11 is a microprocessor that is programmable to run a control process which configures master circuit 14 and causes data transfer between the digital controller 11 and the several slave circuits 16.

Slave circuits 16 are typically provided with unique addresses. In this example the addresses of the four slave circuits are 0, 1, 2, and 3, respectively. The master circuit 14 is coupled to the slave circuits 16 by a slave bus 19 which, in this preferred embodiment, can be either 2 or 3 bits wide. The digital controller 11 is coupled to the master circuit by a standard bi-directional microprocessor bus 18. Bus 18 generally includes address, data, chip select (CS), and read/write (R/W) lines.

By sending words to the master circuit 14, the digital controller can configure the master circuit 14 to have either a two-wire or three-wire serial protocol for sending a bit stream to the slave circuits 16. The size (i.e. number of bits) of the data words can be selected for a particular communications system. The preferred embodiment discussed here will refer to 8-bit data words. As used herein, a "word" is a multi-bit unit of data, provided simultaneously and in parallel. Sometimes, those skilled in the art will refer to a word, such as the 8-bit word described herein, as a "character", since alphanumeric characters can be encoded in 8-bit words.

Once the master circuit 14 has been configured by the process implemented by the controller 11, the master circuit can act as a serial communications device to communicate in a selected serial protocol. As mentioned previously, the bit stream between the master circuit and the slave circuits is then either in a two-wire or a three-wire protocol in this preferred embodiment. However, other protocols are also possible.

Figure 2:
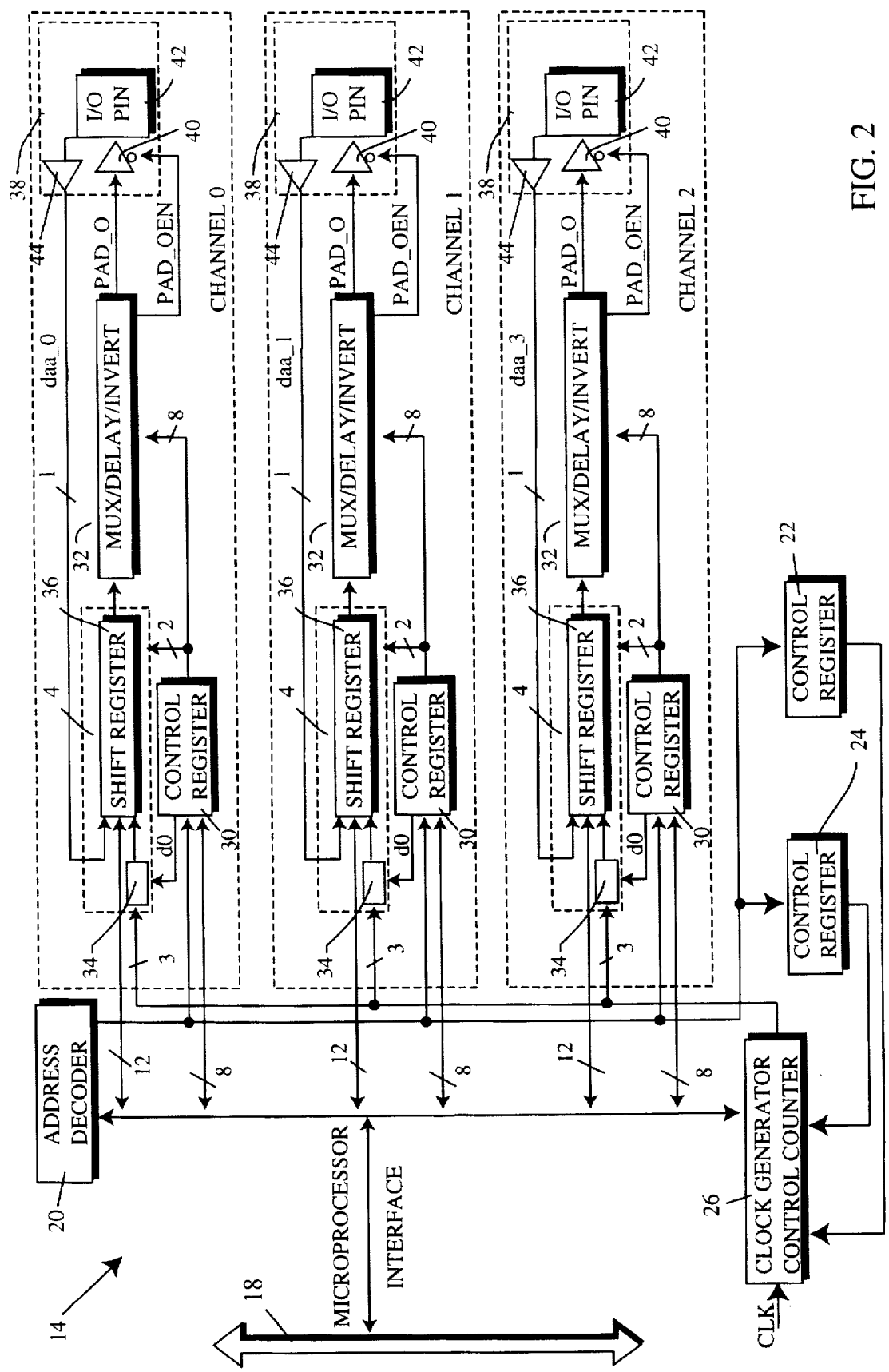
FIG. 2 is a schematic diagram of a master circuit of FIG. 1.

A block schematic diagram of a representative master circuit 14 appears in FIG. 2. As previously stated, the interface between the master circuit 14 and the digital controller 11 is preferably through a bi-directional microprocessor bus 18. Data words sent to the master circuit 14 from the digital controller 11 are applied to the inputs of an address decoder 20 which directs the data word to one of five control registers, such as the three control registers 30, or the control registers 22 or 24.

The two-wire or three-wire bit streams are transferred between the master circuit 14 and the slave circuits 16 correspond to two channels or three channels of the master circuit 14 shown in FIG. 2. The three channels are labeled "CHANNEL 0", "CHANNEL 1", AND "CHANNEL 2."

Before data can be transferred between the master circuit 14 and a slave circuit 16, the master circuit 14 is preferably configured by programming the five control registers. A separate data word is used for each control register. Therefore, five data words are used to configure the master circuit 14. However, no particular order of programming these registers is required.

A combined clock generator/control counter 26 processes an incoming clock signal to develop a reference clock REFCLK, a double frequency clock REFCLK×2 clocking at twice the frequency of REFCLK, and a data window. To configure the control counter 26, the digital controller 11 sends a data word to the master circuit 14. The address decoder 20 decodes the address of a counter control register 22 and enables the counter control register 22 to accept the data word. This register will be described in the discussion of FIG. 6a. To configure the clock generator 26, the digital controller 11 sends another data word to the master circuit 14. The address decoder 20 decodes the address of a clock control register 24 (which is further described with reference to FIG. 6b) and enables the clock control register 24 to accept the data word. The counter control register 22 and the clock control register 24 together configure the combined clock generator/control counter 26.

The step of configuring a channel of the master circuit 14 will only be described in detail for a single representative channel in which like reference numerals refer to like components. This step is done once per channel for a total of three times. The address decoder 20 enables a control register 30 for a channel selected by the digital controller 11. The control register determines the mode of operation of the channel by configuring the shift circuitry 4 and the MUX/delay/inverter circuitry 32 of the selected channel.

The shift circuitry 4 contains a clock circuit 34 and a shift register 36. In an "output" mode corresponding to the sending of data from master circuit 14 to a slave circuit 16, the shift register 36 acts as a parallel-to-serial interface; parallel data is input to the shift register 36 from the digital controller 11 and the data is serially shifted out through the MUX/delay/inverter 32 to an output buffer 40. Output buffer 40 is enabled by a PAD_OEN signal to couple the signal PAD_O developed by the MUX/delay/inverter 32 to an I/O pin 42. A more detailed schematic of the MUX/delay/inverter 32 is shown in FIG. 5 and will be described below.

In an "input" mode corresponding to the master circuit 14 receiving data from a slave circuit 16, data is received by an input buffer 44. This buffer applies a signal daa_0, daa_1, or daa_2 (for channels 0, 1, and 2, respectively) to the corresponding shift register 36 where data is then subsequently transferred to the digital controller 11. In this mode of operation, the shift register 36 functions as a serial-to-parallel interface by serially shifting data in from the slave circuits and providing a parallel output word for the digital controller 11.

FIG. 3 is a table illustrating the contents and programming features of the control registers 30. As stated above, a preferred embodiment is to have eight bit data words for programming the control register. The bits are denoted by d0 through d7. The d0 bit of the control register 30 configures the clock circuit 34 to determine whether the rising or falling edge of the reference clock is used to clock the shift register 36. The d1 through d7 bits configure the shift register 36 and the MUX/delay/inverter 32 and further specify the function of the input/out (I/O) pad 38.

The truth table shown for bits d6 and d7 selects different clocks for the shift register 36. If a window is asserted, the data in the shift register is clocked. If the window is not asserted, the shift register is not clocked. As used herein, "high" shall mean bit d7=1 and "low" shall mean d7=0. "Low" shall mean d6=0 and "high" shall mean d6=1. For d7 high, a windowed clock is provided instead of a free-running reference clock. The window signal is produced by the clock generator circuit 26. Bit d6 provides additional clock selection.

Bits d1 and d3 are the bits of the control register 30 which program the shift register. Bit d3 determines the idle value being clocked into the shift registers 36. The d1 or DIR bit configures the direction of data. As in the discussion of FIG. 2, output corresponds to data being sent to the slave circuit 16 from the digital controller 11 in a selected serial protocol. Data input corresponds to receiving data into the master circuit 14 from a slave circuit 16 in a serial fashion and forwarding the data in a parallel fashion to the digital controller 11. Bits d4 and d5 set output delay and output inversion.

The d2 bit specifies whether the channel output is in an open drain or push-pull signal. The open drain arrangement allows the particular channel to share an external line with another signal source. With an open drain, the output buffer drives when the output is low, but not when it is high. In the push-pull arrangement, no external line is shared and buffer 40 is always driven either high or low. The logic circuit of the channel simulating this arrangement with external circuitry is described in FIG. 5.

Figure 4:
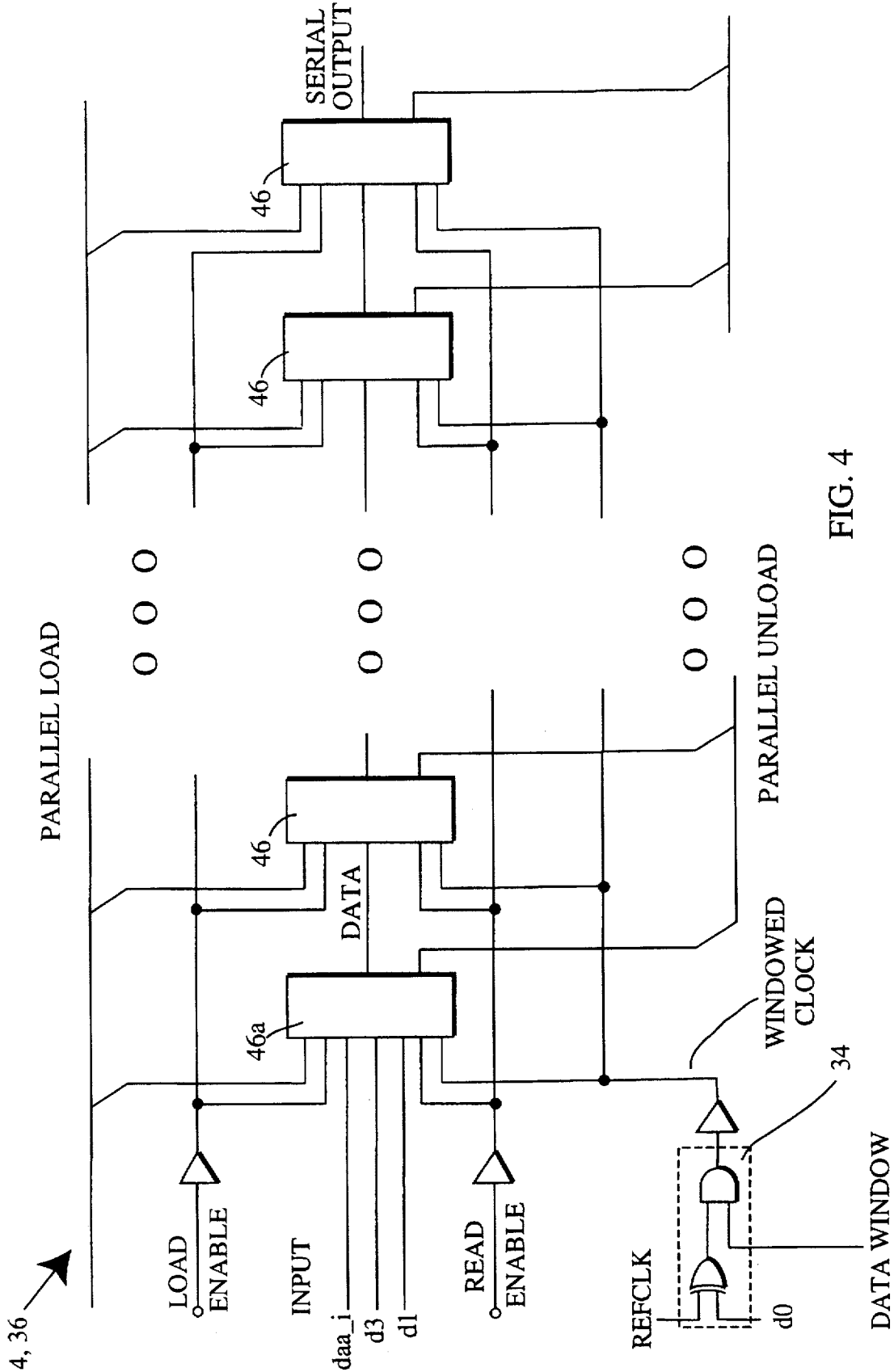
FIG. 4 is a schematic diagram of a shift register circuitry of FIG. 2.

A schematic diagram of the shift circuitry 4, including the shift register 36 and the clock circuit 34, is shown in FIG. 4. The shift register 36 has a flip-flop 46 for each bit of the parallel load. In the preferred embodiment under discussion, there are twelve such flip-flops. The three inputs daa_i, d3, and d1 have already been described where daa_i where {i: 0, 1, 2} and thus is shorthand for the three slave inputs daa_0, daa_1, and daa_2, respectively. The input flip flop 46a possesses additional logic to determine its input source. In output mode, the shift register 36 sequentially shifts the parallel load to a serial output. In input mode, data daa_i in channel i {i: 0, 1, 2} from a slave circuit 16 is sequentially loaded into the shift register 36 where it is output in parallel. The REFCLK and data window inputs to the shift clock register 34 are from the clock generator/control counter 26. The windowed clock output of the shift clock register 34 is input to the control pins of the flip-flops 46. Effectively, the reference clock is gated by the window to clock the flip-flops.

Figure 4A:
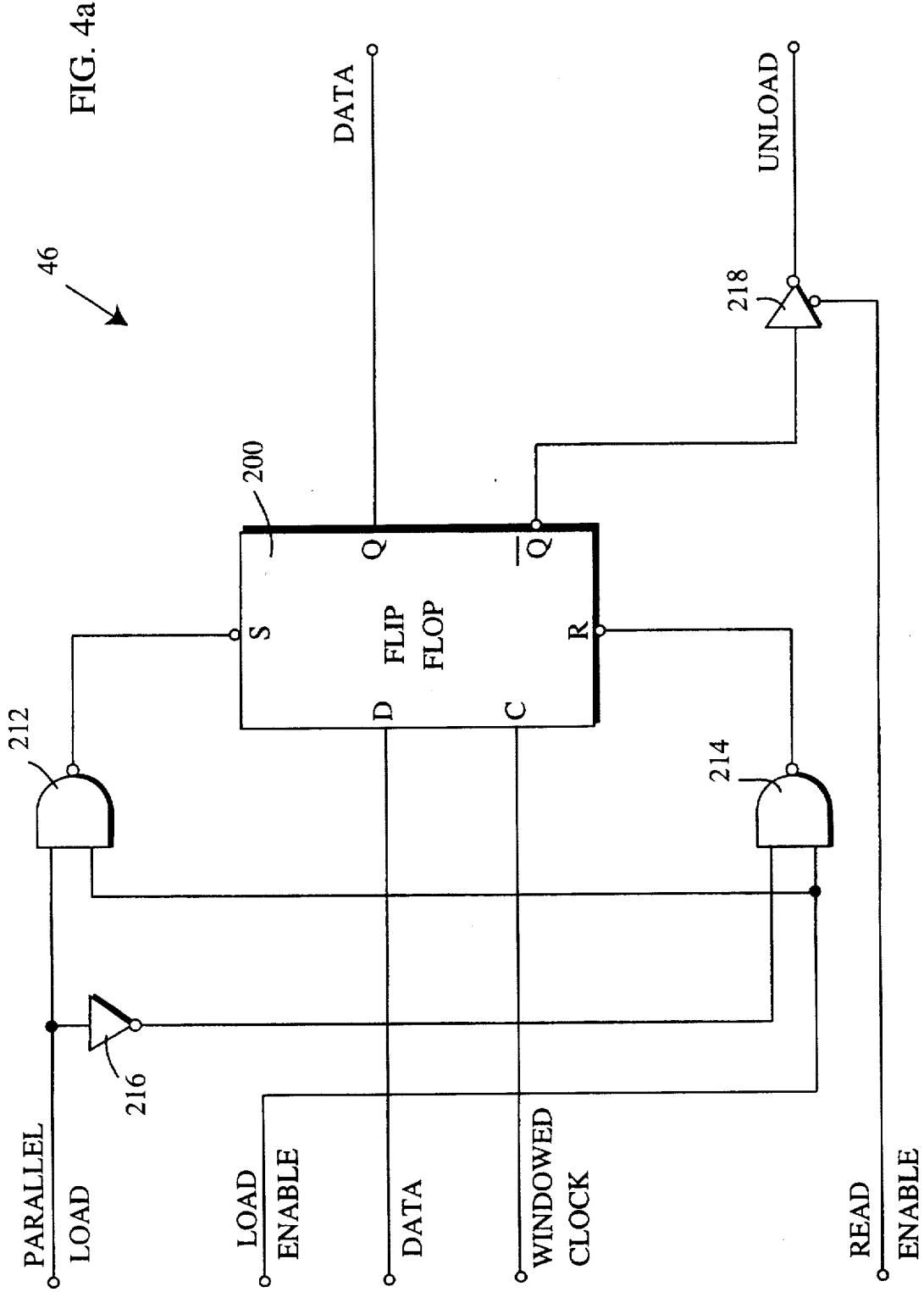
FIG. 4a is schematic of a flip flop used in the shift register of FIG. 4.

A typical schematic of the flip-flop 46 is shown in FIG. 4a. A standard edge-triggered flip-flop 200 is loaded with parallel input via a set NAND gate 212 and a reset NAND gate 214. This controlled by the load enable signal. The windowed clock from the clock circuit 34 is connected to the clock input C of the flip-flop. Data can be sequentially serially shifted from flip-flop to adjacent flip-flop, i.e. from the Q output of a first flip-flop to the D input of a second flip-flop, etc.

A parallel unload can occur when an output buffer 218 is read enabled. This occurs when the shift register 36 acts as a serial-to-parallel interface to unload the stored values of the shift register flip-flops 200 after a serial input from a slave circuit 16 has been sequentially clocked into the shift register 36. Other configurations of conventional flip-flops and logic gates can produce the flip flop 46 performing the same functions in the shift register 36.

The programming functions of the bits of control register 30 within the MUX/delay/inverter 32 are shown in FIG. 5. Bit d1 of control register 30 configures the direction of data flow by enabling the pad to be an output or an input. XOR (exclusive OR) gate 50 causes the output to be inverted or not inverted, depending upon the state of d5. The NAND gates 52a and 52b allow the circuit to form open drain logic 52 as controlled by d2. The open drain logic forms a full open drain circuit when combined with output buffer 40 (see FIG. 2). In open drain mode, the circuit enables the output buffer 40 when the output is LO, and disables it when the output is HI. In push-pull mode, the output buffer 40 is always enabled.

The OR gate 54 uses the d6 and d7 bits to determine whether the channel is a clock channel or a data channel. The 2-to-1 clock multiplexer 56 selects the data signal from the upper path when the output of the OR gate 54 is LO and selects the clock signal from the lower path when the output of the OR gate 54 is HI. The 2-to-1 shift multiplexer 58 chooses output directly from the clock multiplexer 56 when d4 is LO or output from the D flip-flop 60 when d5 is HI, which provides a quarter cycle data delay.

The clocks applied to the clock multiplexer 56 are controlled by the register bits d6 and d7 and the signal WINDOW. When d7=0, the output of the 2×1 MUX 62 is the free running clock REFCLK. When d7=1, the output of the 2×1

MUX 62 is a windowed clock produced by the 2×1 MUX 64. When the signal WINDOW is HI, the windowed clock is derived from REFCLK, and when the signal WINDOW is LO, the windowed clock is derived from the bit d6.

FIG. 6a shows the contents of a counter control register 22. Only the first four bits are used by the window counter in FIG. 7. These bits are input to the window counter portion of circuit 26, which comprises a down counter. This register 22 represents the starting value of the counter.

As seen in FIG. 6b, only the first six bits of the data word are used in configuring the clock generator register in this preferred embodiment. They determine the bit rate by selecting a reference clock.

Figure 7:
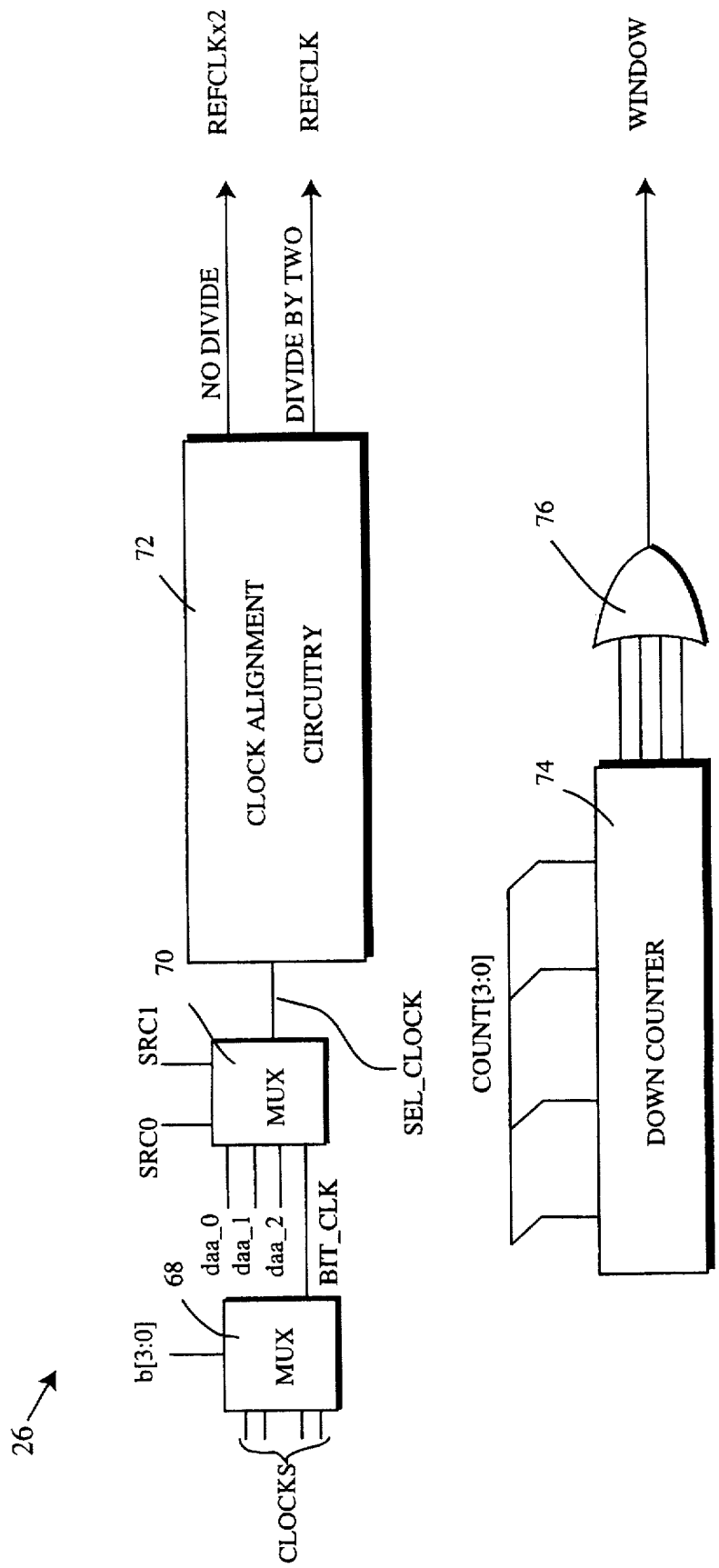
FIG. 7 is a diagram of a clock generator/control counter circuit.

FIG. 7 illustrates the clock generator/control counter 26. The clock generator part of FIG. 7 selects an input clock from any of a number of system sources using a clock multiplexer 68 switched by bits b0–b3. The resulting BIT_CLK signal is applied to a clock select multiplexer 70 where the SRC0 and SRC1 data word bits determine the clock used based on the truth table in FIG. 6b. The resulting SEL_CLOCK is input to the alignment circuitry 72 to develop the reference clocks REFCLK and REFCLK×2 where REFCLK×2 has twice the frequency of REFCLK.

The bottom four bits (i.e. COUNT 0–COUNT 3) of the counter control register 24 shown in FIG. 6a determine the WINDOW signal. WINDOW is asserted as long as the count is non-zero and WINDOW is de-asserted when the count reaches zero. This is accomplished by coupling all of the bits of the down counter 74 to the inputs of an OR gate 76 and thus asserting the window when any of bit is HI.

Figure 8:
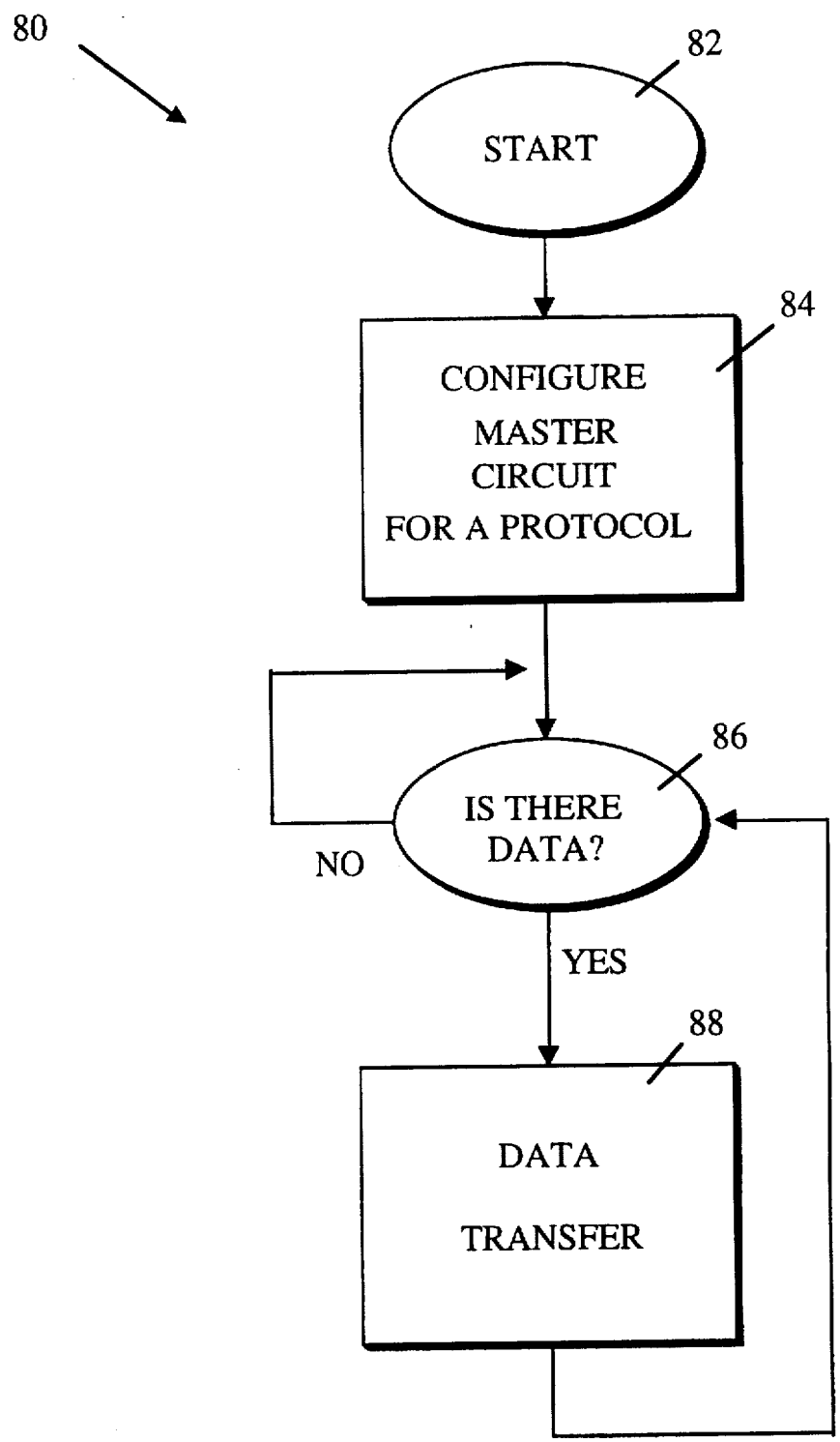
FIG. 8 is a flowchart showing a basic sequence of steps forming a method of serial communication in accordance with the present invention.

A method 80 for serial communication is illustrated in FIG. 8. The first step 84 configures the master circuit 14 for a selected serial protocol. If there is no data to transfer, step 86 enters an idle state awaiting data. Otherwise, data transfer occurs in step 88, after which process control returns to step 86. The steps associated with data transfer are illustrated more explicitly in FIGS. 9 and 10.

Figure 9:
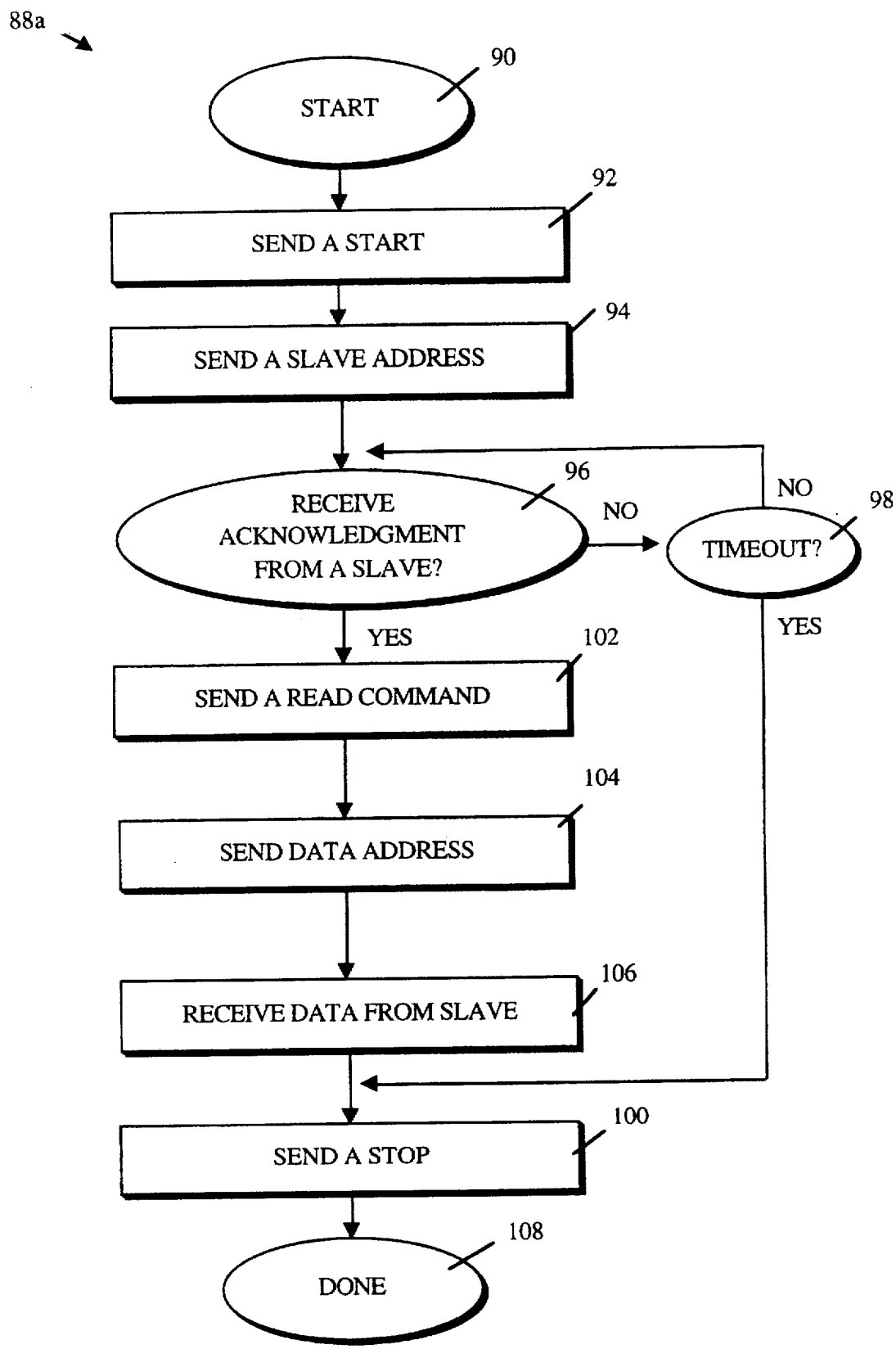
FIG. 9 is a flowchart showing a sequence in a step of data transfer in FIG. 8 to read from a slave circuit.

The data transfer method 88a for reading data from a slave 16 is illustrated in FIG. 9. The master circuit 14 is operating under the direction of a process running on the digital controller 11. The process begins at 90 and, in a step 92, the digital controller 11 (typically a microprocessor) sends a start command to the master circuit 14 followed by a slave address (such as 0–3) in a step 94. The addressed slave circuit 16 will then send an acknowledgment or confirmation back in a step 96 to the master circuit 14 and controller 11 if it is ready to transfer data. If the acknowledgment is not sent within a specified time, a "time-out" decision is made in a step 98 whether the master circuit 14 and digital controller 11 should continue to wait for a response or whether the digital controller 11 should send a stop command in a step 100. Assuming an acknowledgment is sent by the slave 16 and received by the master 14 and controller 11 within the time-out period, a read command is then sent to the slave in a step 102 followed by a data address in a step 104. The slave circuit responds in a step 106 by sending data to the address sent in step 94. The data transfer ends in a step 108 when the master circuit 14 sends a stop command in a step 100 to the slave circuit 16.

Figure 9A:
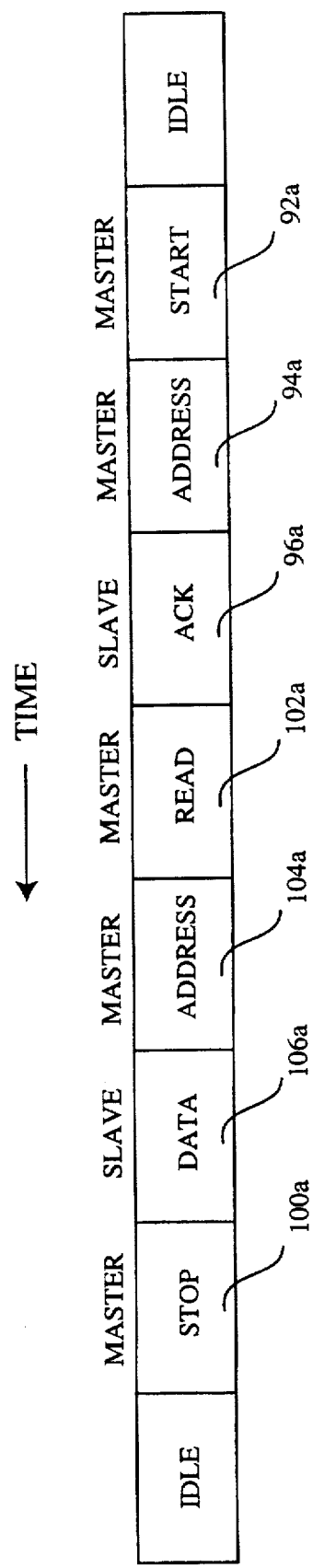
FIG. 9a illustrates a sequence of commands exchanged between a master circuit and a slave circuit to read data from a slave circuit during the data transfer of FIG. 9.

FIG. 9a shows a sequence of data transferred between the master circuit 14 and a selected slave circuit 16 during a successful data transfer process 88a for reading data. The sequence begins at the right of the diagram and the time sequence is right-to-left. The data corresponding to the steps in process 88a in FIG. 9 are labeled with the same number with the addition of a suffix "a." Initially, the system is in a idle state until data transfer step 88a begins. The master circuit 14 first transmits a start command to a selected slave circuit 16 followed by slave circuit address. The selected slave circuit 16 responds with a primary acknowledgment. This initial acknowledgment is required for the commencement of data transfer. Subsequent acknowledgments (not shown) from the selected slave circuit 16 to the commands from the master circuit 14 occur after each transfer (as will be appreciated by those skilled in the art), but are not included here for simplicity. The master circuit then sends a read command to the selected slave circuit followed by the data address. The slave then sends the data. Finally, the master circuit 16 sends a stop command to the selected slave circuit, and the system returns to its idle state.

Figure 10:
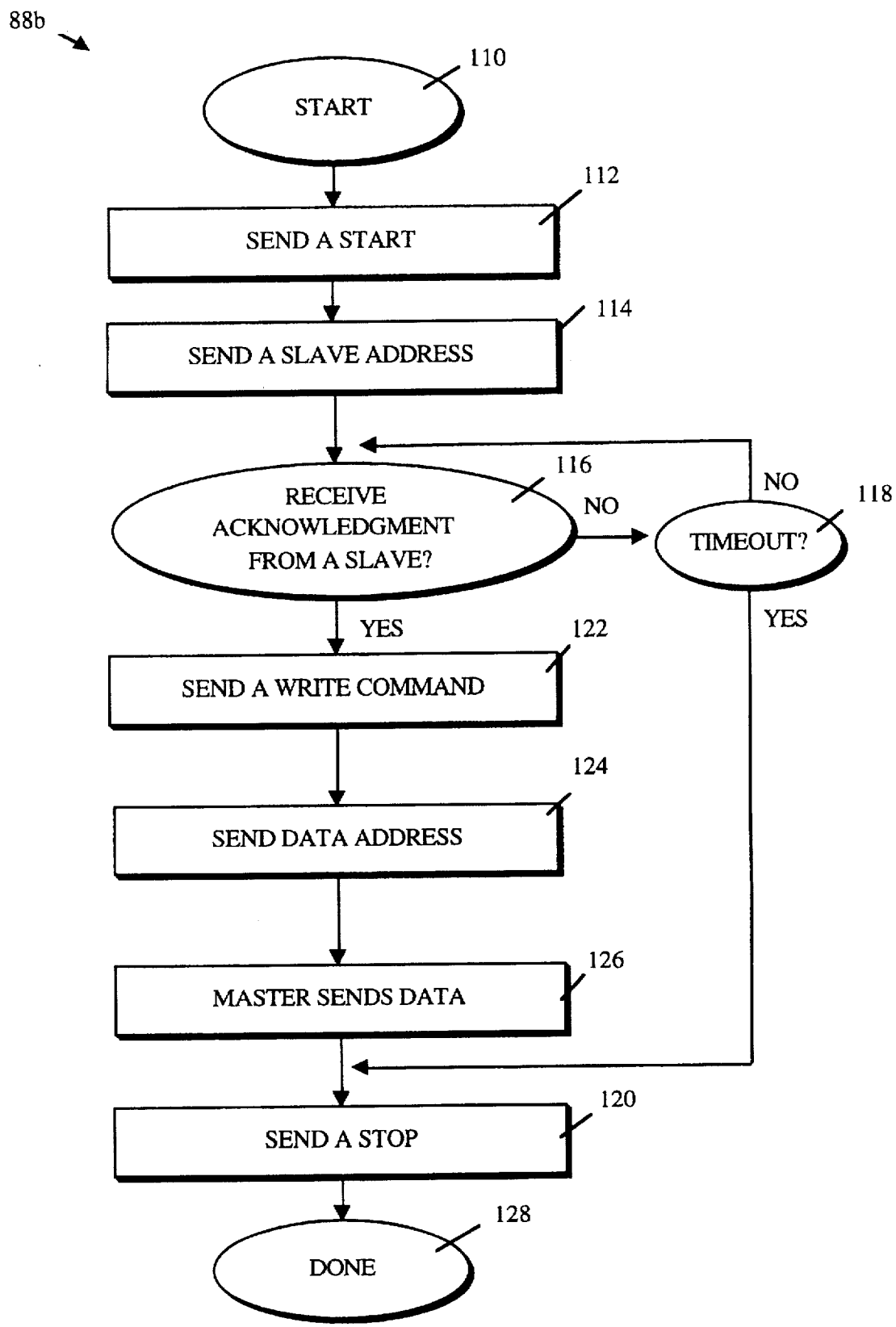
FIG. 10 is a flowchart showing a sequence in a step of data transfer in FIG. 8 to write data to a slave circuit.
Figure 10A:
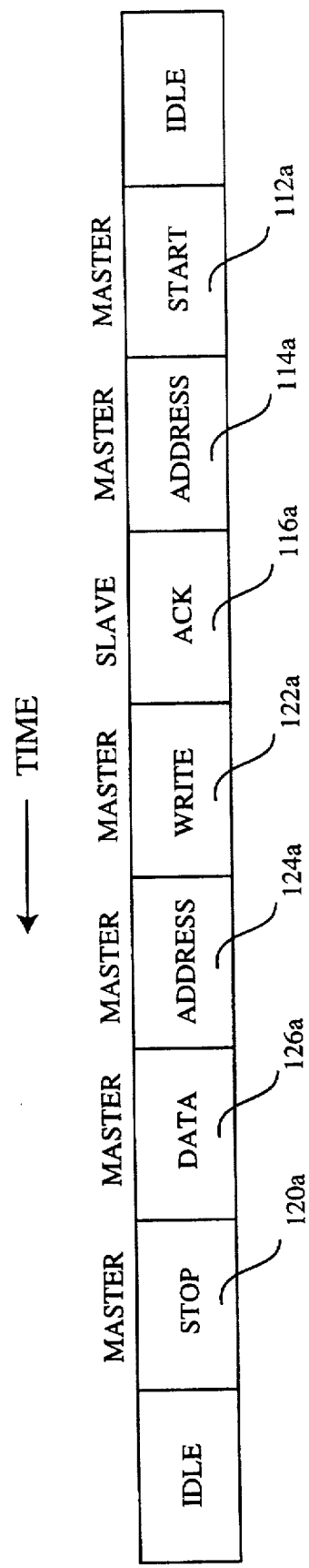
FIG. 10a illustrates a sequence of commands exchanged between a master circuit and a slave circuit to write data to a slave circuit during the data transfer of FIG. 10.

The related data transfer process 88b for writing data to a slave circuit 16 is illustrated in FIGS. 10 and 10a. Again, the master circuit 14 is operating controlled by a process running on the digital controller 11. The process begins at 110 and, in a step 112, he digital controller 11 sends a start command to the master circuit 14 followed by a slave address in a step 114 (such as 0–3). The master circuit 14 and digital controller 11 should then receive an acknowledgment in a step 116 from the slave circuit 16. If the acknowledgment is not sent within a specified time, a decision is made in a step 118 whether the master circuit 14 and digital controller 11 should continue to wait for a response or end a stop in a step 120 (i.e. "time-out"). Assuming an acknowledgment is sent by the slave 16 and received by the master 14 and controller 11, a write command is sent in a step 122 to the addressed slave circuit 16 followed by a data address 124. The master circuit 14, in a step 126, sends data to the data address specified in step 124. The data transfer ends with a step 128 when the master circuit 14 sends a stop command in a step 120 to the slave circuit 16.

FIG. 10a shows a sequence of commands transferred between the master circuit 14 and a selected slave circuit 16 during a successful data transfer 88b for the process of writing data 110. The data corresponding to steps in process 88b are labeled with the same numbers with an "a" suffix. The process begins at the right of the diagram, and the time sequence is right-to-left. Initially, the system is in a idle state until data transfer 88 begins. The master circuit 14 first transmits a start command to a selected slave circuit 16 followed by slave circuit address. The selected slave circuit 16 sends an acknowledgment. As in the process of reading from a slave, this initial acknowledgment is required to initiate the transfer. Subsequent acknowledgments (not shown) from the selected slave circuit 16 to the commands form the master circuit 14 are not shown, for simplicity. The master circuit then sends a write command to the selected slave circuit followed by the data address. Finally, the master circuit 16 sends a stop command to the selected slave circuit, and the digital communications system returns to its idle state.

The master circuit 14 is configurable in wide variety of serial interface protocols including, but by no means limited to, the Phillips I²C and Microwire. Therefore, the method of serial communications 80 can be defined by I²C, Microwire, other standardized protocols, and custom designed protocols.

We claim:

1. An integrated parallel to serial digital communication system comprising:

a digital controller capable of communicating in parallel with multi-bit words, a master circuit coupled via a digital bus that includes data address, and control lines to communicate with said digital controller in parallel with multi-bit words and further capable of communicating in a plurality of standard and customized serial protocols, wherein said master circuit is programmably configured in a selected serial protocol that requires no more than three wires by said digital controller, and at least one slave circuit having a slave address, the at least one slave circuit being coupled to said master circuit and responsive to communications in said selected serial protocol programmed into said master circuit by said digital controller, and wherein said digital controller is configured to communicate with said at least one slave circuit through said master circuit by sending said slave address to said master circuit.

2. A digital communications system as recited in claim 1 wherein said digital controller is a microprocessor capable of configuring said master circuit, sending data to said master circuit, and receiving data from said master circuit.

3. A digital communications system as recited in claim 2 wherein said microprocessor can configure said master circuit as either a two-wire or a three-wire serial protocol.

4. A digital communications system as recited in claim 2 wherein said master circuit includes a control register that is programmable by said microprocessor.

5. A digital communications system as recited in claim 4 wherein said control register permits said master circuit to operate as either a data channel or as a clock.

6. A digital communications system as recited in claim 5 wherein when said master circuit is operated as a clock it can be operated as either a free-running clock or as a windowed clock.

7. A digital communications system as recited in claim 5 wherein when said master circuit is operated as a data channel at least one of the following options can be selected by programming said control register:

(a) inversion of data channel;

(b) delay of data channel;

(c) direction of the data channel; and (d) an edge of an input clock which clocks said data channel.

8. A digital communications system as recited in claim 2 wherein said microprocessor is further operative to receive an acknowledgment from said slave circuit via said master circuit if said slave circuit is ready for data transfer.

9. A digital communications system as recited in claim 8 wherein said microprocessor is operative to send either a read command or a write command to said master circuit in response to a receipt of said acknowledgment.

10. A digital communications system as recited in claim 9 wherein said microprocessor is further operative to send an address to store data to said master circuit after sending a read command to said master circuit.

11. A digital communications system as recited in claim 9 wherein said microprocessor is further operative to send an address to said master circuit as to where data to be written to said slave circuit is located after sending a write command to said master circuit.

12. A digital communications system as recited in claim 9 wherein said microprocessor is further operative to send a stop command to said master circuit after said data transfer with said slave circuit has been accomplished.

13. A digital communications system as recited in claim 3 wherein said digital bus comprises a personal computer bus.

14. A digital communications system as recited in claim 1 wherein said master circuit is a bi-directional, parallel-to-serial and serial-to-parallel communications circuit capable of operating in a plurality of serial protocols.

15. A digital communication system as recited in claim 14 wherein said master circuit can operate in a three-wire protocol.

16. A digital communication system as recited in claim 14 wherein said master circuit can operate in a two wire protocol.

17. A digital communication system as recited in claim 14 wherein a plurality of slave circuits are coupled to said master circuit by a slave bus, each of said slave circuits having an address.

18. A digital communication system as recited in claim 17 wherein said microprocessor can transfer data with a selected slave circuit by providing a slave address of said slave circuit to said master circuit.

19. A serial interface circuit comprising:

a plurality of programmable channels contained within a master circuit that is configurable by a digital controller over a common address/data/control bus, each of said plurality of programmable channels includes a control register which can be programmed over said common address/data/control bus, and each channel has a dedicated I/O port such that a multiplicity of said dedicated I/O ports are collectively capable of supporting a selected serial protocol based upon a programming of said plurality of programmable channels, wherein said selected serial protocol is from a plurality of serial protocols consisting of standard and customized protocols.

20. A serial interface circuit as recited in claim 19 wherein said multiplicity of dedicated I/O ports can support a three-wire serial protocol.

21. A serial interface circuit as recited in claim 19 wherein said multiplicity of dedicated I/O ports can support a two-wire serial protocol.

22. A serial interface circuit as recited in claim 21 wherein said multiplicity of dedicated I/O ports can support a three-wire serial protocol.

23. A serial interface circuit as recited in claim 19 wherein each of said programmable channels includes:

a control register coupled to said address/data/control bus;

a shift register coupled to said address/data/control bus and to said control register; and protocol circuitry coupled to said control register and between said shift register and said I/O port.

24. A serial interface circuit as recited in claim 23 further comprising an address decoder coupled to said address/data/control bus and operative to selectively enable a shift register and a control register of a selected programmable channel.

25. A serial interface circuit as recited in claim 23 wherein said control register includes a plurality of control bits, wherein at least one of said control bits causes said programmable channel to operate as a data channel or a clock channel.

26. A serial interface circuit as recited in claim 25 wherein at least one control bit causes said programmable channel to operate as either a free-running clock or a windowed clock when operating as a clock channel.

27. A serial interface circuit as recited in claim 25 wherein, when said programmable channel is operating as a data channel, bits of said control register correspond to:

(a) inversion of said data channel;

(b) delay of data channel;

(c) direction of said data channel; and (d) an edge of an input clock which clocks said data channel.

28. A method for providing integrated parallel to serial communication comprising the steps of:

coupling a master circuit to a digital controller;

coupling at least one slave circuit to said master circuit;

programming said master circuit under the control of a process running on said digital controller, said programming includes writing configuration data from said digital controller to at least one control register of said master circuit to specify a selected serial protocol from a plurality of serial protocols consisting of standard and customized protocols into the master circuit that is coupled to the digital controller; and communicating between said digital controller and said master circuit in parallel using multi-bit words, and communicating serially between said master circuit and said at least one slave circuit using said selected serial protocol.

29. A method as recited in claim 28 wherein said selected serial protocol is a two-wire protocol.

30. A method as recited in claim 28 wherein said selected serial protocol is a three-wire protocol.

31. A method as recited in claim 28 wherein said master circuit includes a plurality of channels, each of which is provided with a control register receptive to said configuration data.

32. A method as recited in claim 31 wherein said step of writing configuration data includes the step of writing data to a control register of at least one channel to cause said at least one channel to operate as a clock.

33. A method as recited in claim 32 wherein said step of writing data to said control register of said at least one channel to cause said at least one channel to operate as a clock causes said at least one channel to operate as one of a free-running clock and a windowed clock.

34. A method as recited in claim 28 wherein said step of writing configuration data includes the steps of:

(a) writing inversion data;

(b) writing delay data;

(c) writing direction data; and (d) writing clock edge data.

35. A method as recited in claim 28 wherein said step of communicating between said digital controller and said at least one slave circuit includes the step of sending a slave address of said slave circuit from said digital controller to said master circuit.

36. A method as recited in claim 35 wherein said step of communicating includes the step of said digital controller receiving an acknowledgment from said slave circuit via said master circuit in response to said step of sending of said slave address.

37. A method as recited in claim 36 wherein said step of communicating includes sending either a read command or a write command from said digital controller to said master circuit in response to a receipt of said acknowledgment by said digital controller.

38. A method as recited in claim 37 wherein said step of communicating includes the step of sending an address for data transfer from said digital controller via said master circuit to said slave circuit after sending said read command.

39. A method as recited in claim 37 wherein said step of communicating includes sending an address for data transfer from said digital controller via said master circuit to said slave circuit after said step of sending said write command.

40. A method as recited in claim 37 wherein said step of communicating includes the step of sending a stop command to said master circuit after said data transfer has been accomplished.

* * * * *